(12) United States Patent
Okumura et al.

(10) Patent No.: US 6,582,813 B2
(45) Date of Patent: Jun. 24, 2003

(54) BIAXIALLY ORIENTED POLYESTER FILM

(75) Inventors: Hiroteru Okumura, Shiga-ken (JP); Takatoshi Miki, Shiga-ken (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/886,069

(22) Filed: Jun. 21, 2001

(65) Prior Publication Data

US 2003/0039852 A1 Feb. 27, 2003

(30) Foreign Application Priority Data

Jun. 22, 2000 (JP) ........................................ 2000-187431

(51) Int. Cl.$^7$ ............................ B32B 5/16; B32B 27/18; B32B 27/36
(52) U.S. Cl. ........................ 428/327; 428/323; 428/480; 428/910; 525/437; 525/444
(58) Field of Search ................................ 428/323, 327, 428/480, 910; 525/437, 444

(56) References Cited

U.S. PATENT DOCUMENTS

| | | | |
|---|---|---|---|
| 4,798,875 A | * 1/1989 | Itoyama et al. | 525/444 |
| 5,258,461 A | 11/1993 | Facci et al. | |
| 5,422,175 A | 6/1995 | Ito et al. | |
| 5,780,158 A | * 7/1998 | Asai et al. | 428/412 |
| 6,054,209 A | * 4/2000 | Imanishi et al. | 428/327 |
| 6,156,441 A | * 12/2000 | Hamada et al. | 428/480 |
| 6,361,856 B1 | * 3/2002 | Wakai et al. | 428/220 |

FOREIGN PATENT DOCUMENTS

| | | |
|---|---|---|
| BE | 886 134 A | 5/1981 |
| EP | 0 347 646 A2 | 12/1989 |
| EP | 0 411 601 A2 | 2/1991 |
| EP | 0 429 185 A2 | 5/1991 |
| EP | 0 507 312 A2 | 10/1992 |
| EP | 0 543 600 A2 | 5/1993 |
| EP | 0 947 315 A1 | 10/1999 |
| EP | 0 991 057 A1 | 4/2000 |
| JP | 01-090255 A * | 4/1989 |
| JP | 02008090 | 1/1990 |
| JP | 04164628 | 6/1992 |
| JP | 11-005855 A * | 1/1999 |

\* cited by examiner

*Primary Examiner*—Vivian Chen
(74) *Attorney, Agent, or Firm*—Edwards & Angell, LLP; David G. Conlin; Lisa S. Hazzard

(57) ABSTRACT

The present invention relates to a biaxially oriented polyester film having at least one layer of a sea-island structure which satisfies the following formulae (1) and (2) at the same time, said film having a specific surface resistance of not more than $1 \times 10^{15}$ Ω:

$$50 \leq X/Y \tag{1}$$

$$5 \leq N \leq 200 \tag{2}$$

wherein X is the mean value of length (μm) of the islands in the longitudinal direction of the film; Y is the mean value of length (μm) of the islands in the width direction of the film; and N is the number (per μm$^2$) of the islands existing in the section of the film in its width direction.

7 Claims, No Drawings

BIAXIALLY ORIENTED POLYESTER FILM

BACKGROUND OF THE INVENTION

The present invention relates to a biaxially oriented polyester film, more particularly to a laminated biaxially oriented polyester film which has easy tearability in at least one direction, excels in antistatic properties, and is useful as a packaging material for foods such as confectionary, pickles, retort pouch foods, etc., pharmaceuticals and such.

Since biaxially oriented polyester films represented by polyethylene terephthalate film are excellent in mechanical properties, electrical properties, chemical resistance, dimensional stability, etc., they are used as base for a variety of commercial products in many fields of industry such as information recording materials, capacitors, packaging materials, printing plates, insulators, photographic films, etc. In the recent years, polyester films have been popularly used as various types of packaging film, and amid the growing recognition of importance of environmental problems, it is expected that the scope of their use will be further expanded in view of their capability to prevent environmental pollution at the time of waste disposal.

The packaging polyester films find their way into many uses, and they are needed in various fields of industry such as foods, electric and electronic parts, machinery, equipment, building materials, chemicals, etc.

Various types of packing or wrapping bags utilizing plastic films, particularly those made by laminating a biaxially oriented plastic film and a sealant film, are popularly used for packaging foods, medicines and sundry goods, but these packages have the problem that when it is tried to rip them open, they may not be ripped up smoothly and linearly, causing a possibility of scattering the contents and consequent soiling of the user's clothes when the packages are opened.

The packages using a plastic film having antistatic properties are also commonly used for packaging or wrapping powders, but these packages also involve the problems; some of them are bad in tearability by hand while others might be torn up in the wrong direction to cause scattering of the contents.

As a result of the present inventors' earnest study to solve the above problems, it has been found that a film having a layer with a specific sea island structure and also possessing a specific surface resistance can solve the above problems.

The present invention has been attained on the basis of the above finding.

SUMMARY OF THE INVENTION

An object of the present invention is to provide a laminated polyester packaging film which can be ripped open with ease and linearly with no fear of causing scattering of the contents and also capable of preventing adhesion of powders.

To attain the above aim, in the first aspect of the present invention, there is provided a biaxially oriented polyester film having at least one layer of a sea island structure which satisfies the following formulae (1) and (2) at the same time, said film having a specific surface resistance of not more than $1 \times 10^{15}$ $\Omega$:

$$50 \leq X/Y \quad (1)$$

$$5 \leq N \leq 200 \quad (2)$$

wherein X is the mean value of length ($\mu$m) of the islands in the longitudinal direction of the film; Y is the mean value of length ($\mu$m) of the islands in the width direction of the film; and N is the number (per $\mu$m$^2$) of the islands existing in the section of the film in its width direction.

DETAILED DESCRIPTION OF THE INVENTION

The invention will be described in detail below.

The "polyesters" referred in the present invention are the polymers having ester groups obtained from polycondensation of dicarboxylic acids and diols or hydroxycarboxylic acids. Examples of the dicarboxylic acids usable for the said polycondensation include terephthalic acid, succinic acid, isophthalic acid, adipic acid, azelaic acid, sebacic acid, dodecanoic diacid, 2,6-naphthalenedicarboxylic acid, and 1,4-cyclohexanedicarboxylic acid. Examples of the diols include ethylene glycol, 1,3-propanediol, 1,6-hexanediol, 1,4-butanediol, diethylene glycol, triethylene glycol, neopentyl glycol, 1,4-cyclohexanedimethanol and polyethylene glycol. Examples of the hydroxycarboxylic acids include p-hydroxybenzoic acid and 6-hydroxy-2-naphthoic acid.

Typical examples of such polymers are polyethylene terephthalate and polybutylene terephthalate. These polymers may be homopolymers or ones obtained by copolymerizing a third component.

Polyester D used in the present invention is a polyester obtained from a polycondensation reaction of a polyester B comprising a dicarboxylic acid and a glycol and a dehydrated condensate C mainly comprising a glycol. It is preferably one obtained from a polycondensation reaction of a polyester B comprising a dicarboxylic acid containing not less than 50 mol % of an aromatic dicarboxylic acid and a glycol containing not less than 50 mol % of a $C_3$–$C_{10}$ glycol and a dehydrated condensate C mainly comprising a $C_3$–$C_{10}$ glycol. Its preparation method, however, is not specified. Examples of the polyester B include polyethylene terephthalate, polypropylene terephthalate and polybutylene terephthalate. Examples of the dehydrated condensate C include polyethylene glycol, polytrimethylene glycol and polytetramethylene glycol.

The film of the present invention is a biaxially stretched film in view of high strength and excellent dimensional stability.

In order to prevent adhesion of the contents to the package, the film of the present invention needs to have antistatic properties. For this purpose, the polyester film of the present invention has a specific surface resistance of not more than $1 \times 10^{15}$ $\Omega$, preferably not more than $5 \times 10^{12}$ $\Omega$, more preferably not more than $5 \times 10^{11}$ $\Omega$. When the specific surface resistance of the film is more than $1 \times 10^{15}$ $\Omega$, the material contained in the package, especially powder, tends to adhere to the package.

As methods for affording antistatic properties to the film, there is exemplified a method in which an antistatic agent is incorporated in the film or the film is coated with an antistatic agent.

It is possible to use any type of antistatic agent as far as it is capable of reducing specific surface resistance. Examples of such antistatic agent include glycerin fatty acid esters, polyoxyethylene alkyl ethers, polyoxyethylene alkylphenyl ethers, alkyl diethanolamines, hydroxyalkyl monoethanolamines, polyoxyethylene alkylamines, alkyl diethanolamides, alkyl sulfonates, alkylbenzenesulfonates, alkyl phosphates, tetraalkylammonium salts, alkylbetains, alkylimidazoliumbetains and the like. Of these antistatic agents, alkyl sulfonates are preferred.

In the film of the present invention, the mixing ratio (by weight) of polyester D/polyester A falls within the range of 30/70 to 5/95, preferably 25/75 to 10/90, more preferably 20/80 to 10/90. When the ratio of polyester D exceeds 30% by weight, there is a tendency for the film to lower in mechanical strength and/or to increase in thickness unevenness, which may make the film impracticable.

Polyester D used in the present invention is preferably a melt mixed product of a polyester B and a dehydrated condensate C with its repeating units comprising mainly a $C_3$–$C_{10}$ glycol, in which the polyester B/dehydrated condensate C mixing ratio preferably falls within the range of 55/45 to 98/2, more preferably 5/95 to 30/70, especially 10/90 to 25/75. When the ratio of dehydrated condensate C is less than 2% by weight, insular dispersion of polyester D in polyester A matrix may not take place to badly deteriorate linear tearability of the film. On the other hand, when the ratio of the said condensate exceeds 45% by weight, the obtained film may be reduced in mechanical strength.

For affording easy and linear tearability to the film, it is necessary to effect insular dispersion of polyester D in at least one layer of the film, and the state of such insular dispersion of polyester D needs to satisfy the following formulae (1) and (2) at the same time:

$$50 \leq X/Y \quad (1)$$

$$5 \leq N \leq 200 \quad (2)$$

wherein X is the mean value of length (1 μm) of the islands in the longitudinal direction of the film; Y is the mean value of length (μm) of the islands in the width direction of the film; and N is the number (per μm$^2$) of the islands existing in the section of the film in its width direction.

Thus, in case where the mean values of length in the longitudinal and width directions of the islands observed on the section in the longitudinal direction and the section in the width direction of the film are supposed to be X (μm) and Y (um), respectively, if X/Y is less than 50, linear tearability of the film may be bad. Also, when N is less than 5 (per μm$^2$), linear tearability may be badly deteriorated, and when N is greater than 200 (per μm$^2$), the dispersed polyester D is in excess, making it difficult to rip the film linearly.

A process for producing the film of the present invention is described concretely below, but the following instance is not limitative to the present invention and it is possible to use other methods as far as they are capable of producing the described effects of the present invention.

The respective polyester chips dried by a known technique are supplied to a melt extruder where the chips are heated to a temperature above the melting points of the respective polymers and thereby melted. Then the molten polymers are coextruded from a die onto a rotary cooling drum whereby the molten polymers are rapidly cooled to a temperature below the glass transition temperature and solidified to obtain a non-oriented sheet of a substantially amorphous state. In the above operation, in order to improve flatness of the sheet, it is preferable to enhance adhesion between the sheet and the rotary cooling drum. In the present invention, the electrostatic pinning method and/or the liquid coating method are preferably used for this purpose. In case of using an antistatic agent, it may be previously blended in the polyester chips.

In the present invention, the thus obtained sheet is stretched in the biaxial directions to make a film. Stretching is carried out under the following conditions. First, the said non-stretched sheet is stretched preferably 2 to 6 times in the machine direction at 70 to 145° C. to make a monoaxially (longitudinally) stretched film, then further stretched 2 to 6 times in the transverse direction at 90 to 160, and then subjected to a heat treatment at 150 to 250% for 1 to 600 seconds. In this operation, the film is preferably relaxed 0.1 to 20% in the machine direction and/or the transverse direction at the highest temperature zone of the heat treatment and/or the cooling zone at the terminal of the heat treatment. Also, if necessary, the produced film may be subjected to re-stretching in the machine direction and/or the transverse direction.

It is possible to obtain a sea island structure satisfying the formulae (1) and (2) by properly adjusting the stretch ratio. For instance, in case where the value of X/Y of the formula (1) is not more than 50 at the stage of the sheet, the stretch ratio in the longitudinal direction is enlarged while that in the transverse direction is lessened within the above-defined range. Also, in case where the number of the islands N of the formula (2) is too large at the stage of the sheet, the stretch ratio in the longitudinal direction may be raised to enlarge X while reducing the number of the islands per unit area to satisfy the formula (2). It is also possible to adjust the number of the islands of the layer having the sea island structure by controlling the extruding temperature at the time of coextrusion or the degree of kneading. According to circumstances, when the extruding temperature is raised and kneading is conducted sufficiently, polyester D is uniformly dispersed in polyester A, which leads to a reduction of the size of the islands, resulting in an increase of the number of the islands. It is further possible to adjust the number of the islands at the sheet stage by controlling the speed of the take-up rolls and the die slit interval. Thus, by properly selecting the coextruding and/or stretching conditions, it is possible to make a laminated film having a layer of a sea island structure satisfying the formulae (1) and (2).

In the process of producing the polyester film according to the present invention, it is possible to incorporate a so-called in-line coating step in which the sheet just after stretched in the machine direction is coated before entering a tenter for transverse stretching and dried in the tenter for improving the specific properties such as adhesion, antistatic properties, weather resistance or surface hardness, provided that such an operation won't be prejudicial to the purport of the present invention. Also, after production of the laminated film, it may be subjected to various types of off-line coating. It is possible to provide antistatic properties and adjust specific surface resistance of the film by such coating. Coating may be applied on one side or both sides of the film. Both water-based and solvent-based coating materials can be used for off-line coating, but a water-based or water-dispersed type coating material is preferably used for in-line coating.

In the polyester film of the present invention, it is possible to mix other types of thermoplastic resin such as polyethylene naphthalate and polytrimethylene naphthalate, and additives such as ultraviolet absorber, antioxidant, surfactant, pigment, fluorescent brightener, etc., within limits not affecting the effect of the present invention.

As described above, the present invention provides a laminated polyester film for packaging which allows easy and linear rip-opening of the package to eliminate the fear of causing scattering of the contents on opening of the package and is also proof against adhesion of powders.

EXAMPLES

The present invention is further illustrated by the following examples, but it is to be understood that these examples are merely intended to be illustrative and not to be construed as limiting the scope of the present invention. The various properties and characteristics were determined or defined as described below. In the following Examples and Comparative Examples, all "percents (%)" are by weight unless otherwise noted.

(1) Specific Surface Resistance

A concentric circular electrode 16008A comprising a 50 mm$\phi$ inner electrode and a 70 mm$\phi$ outer electrode, produced by Yokokawa Hewlet Packard, Ltd., was set on the test piece in an atmosphere of 23° C. and 50% RH, then a voltage of 100 V was applied thereto and specific surface resistance of the test piece was measured by a high resistance meter 4329A manufactured by the same company.

(2) Ash Test

The surface of the test piece was rubbed 10 times both ways with a flannel cloth pad and was brought close to 32-mesh tobacco ash horizontally thereto from above. The amount of ash that adhered to the test piece was visually observed, making evaluation according to the following rating system:

| Rating: | A | B | C | D |
|---|---|---|---|---|
| Amount of ash that adhered: | ← None | | | → Heavy |

(3) Profile Evaluation

The film was embedded in an epoxy resin and cut in the longitudinal or width direction by a cutter. The film section was flattened by a microtome, then the film was subjected to oxygen plasma etching to make a test piece and the configuration of polyester D dispersed insularly in the film was observed under a scanning electron microscope (mfd. by Nippon Denshi KK). From this observation, the average length X ($\mu$m) of the polyester D (islands) in the longitudinal direction and the average length Y ($\mu$m) in the width direction were determined, and X/Y was calculated.

Also, the number of the insularly dispersed polyester D (islands) observed in the layer (in the area of 100 $\mu$m$^2$) composed of polyester A and polyester D in the film section along the width was counted, and the number of the polyester D islands existing per unit area (1 $\mu$m$^2$) was calculated.

(4) Linear Tearability Test

A 300 mm long and 10 mm wide strip was cut out from the polyester film as a test piece. A 3 mm long notch was made at a shorter side of the test piece and it was tried to tear the film (test piece) from the cut with hands. When the film was torn up to the side opposite from the notched side, one point was given to the film. The test was conducted 10 times, and the total point in ten tries was determined. The film was judged acceptable when it obtained 7 points or more.

Example 1

(Preparation of Polyester Chips)

100 parts of dimethyl terephthalate, 70 parts of ethylene glycol and 0.07 part of calcium acetate monohydrate were supplied into a reactor and heated while distilling away methanol to carry out an ester exchange reaction. The reaction mixture was heated to 230° C. taking approximately 4.5 hours after start of the reaction to substantially complete the ester exchange reaction.

Then 0.04 part of phosphoric acid and 0.035 part of antimony trioxide were added and the mixture was polymerized in the usual way. That is, the reaction temperature was raised gradually until finally reaching 280% while the pressure was reduced gradually down to 0.05 mmHg. The reaction was completed after 4 hours, and the reaction product was made into chips by a conventional method to obtain polyester A. Solution viscosity IV of the obtained polyester chips was 0.66.

To 100 parts by weight of dimethyl terephthalate was added 1.2 times its molar quantity of 1,4-butanediol, and the mixture was subjected to a 3.5-hour ester exchange reaction at 150 to 215° C. using tetrabutyl titanate as catalyst in an amount of 106 ppm (calcd. as titanium metal, based on dimethyl terephthalate). This reaction product was successively subjected to a melt polycondensation reaction at 215 to 245° C. under a reduced pressure of not higher than 3 Torr to obtain polyester B. Solution viscosity IV of the obtained polyester chips was 0.85.

In the said polyester A was blended 20% of sodium alkylsulfonate to prepare polyester E.

Also, in the course of the production of the said polyester A, amorphous silica having an average particle size of 2 $\mu$m was added in an amount of 1,000 ppm to prepare polyester F.

Further, the said polyester B and polytetramethylene ether glycol (molecular weight: 2,000) were mixed in the form of chips in an amount of 75% and 25%, respectively, and the mixture was melted and kneaded by a double-screw extruder to prepare polyester D.

(Production of Polyester Film)

Material 1 prepared by mixing the said polyesters A, E and F in a ratio of A/E/F=77/3/20 and material 2 prepared by mixing the said polyesters A and D in a ratio of A/D=70/30 were each melted at 295° C. and coextruded with a two-material and three-layer structure (with material 1 forming the outer (surface) layers and material 2 forming the middle layer) onto a cooled casting drum and thereby cooled and solidified to obtain a non-oriented sheet. This sheet was stretched 4 times in the machine direction at 90° C., and after passing a preheating step in a tenter, it was further stretched 4 times in the transverse direction at 90 and then heat treated at 230° C. for 10 seconds to obtain a 12 $\mu$m thick polyester film. The obtained polyester film had excellent antistatic properties and linear tearability and was a highly practical film.

Examples 2 to 7

The same procedure as defined in Example 1 was conducted except that the mixing ratios of the materials in the middle layer and in polyester D were changed to obtain the corresponding polyester films, and their properties were evaluated.

Examples 8 to 10

The same procedure as defined in Example 1 was conducted except that the mixing ratios of polyester E and polyester A in the outer layers were changed to obtain the corresponding polyester films, and their properties were evaluated.

Comparative Example 1

The same procedure as defined in Example 1 was conducted except that the mixing ratios of the materials in the outer layers, middle layer and polyester B were changed to obtain a corresponding polyester film, and its properties were evaluated. The obtained polyester film showed a good linear tearability but was poor in antistatic properties.

Comparative Examples 2 to 3

The same procedure as defined in Example 1 was conducted except that the mixing ratios of polyester E and polyester A in the outer layers and the mixing ratios of the materials in the middle layer were changed to obtain the corresponding polyester films, and their properties were evaluated. The obtained polyester films were poor in both antistatic properties and linear tearability.

Comparative Example 4

The same procedure as defined in Example 1 was conducted except for a change in mixing ratio of the materials in the middle layer to obtain a corresponding polyester film, and its properties were evaluated. The obtained polyester film had good antistatic properties but was poor in linear tearability.

The results obtained in the above Examples and Comparative Examples are shown collectively in Table 1.

TABLE 1

|  | Example 1 | Example 2 | Example 3 | Example 4 | Example 5 |
|---|---|---|---|---|---|
| Mixing ratios of materials in outer layers |  |  |  |  |  |
| A | 70 | 70 | 70 | 70 | 70 |
| E | 10 | 10 | 10 | 10 | 10 |
| F | 20 | 20 | 20 | 20 | 20 |
| Mixing ratios of materials in middle layer |  |  |  |  |  |
| A | 70 | 80 | 90 | 80 | 80 |
| D | 30 | 20 | 10 | 20 | 20 |
| Mixing ratios of materials in polyester D |  |  |  |  |  |
| B | 75 | 75 | 75 | 95 | 80 |
| C | 25 | 25 | 25 | 5 | 20 |
| Specific surface resistance | $5 \times 10^{11}$ | $5 \times 10^{11}$ | $5 \times 10^{11}$ | $5 \times 10^{11}$ | $5 \times 10^{11}$ |
| Ash test | A | A | A | A | A |
| X/Y | 300 | 200 | 70 | 65 | 350 |
| N | 180 | 60 | 9 | 95 | 100 |
| Tear test | Passed | Passed | Passed | Passed | Passed |

|  | Example 6 | Example 7 | Example 8 | Example 9 | Example 10 |
|---|---|---|---|---|---|
| Mixing ratios of materials in outer layers |  |  |  |  |  |
| A | 70 | 70 | 40 | 73 | 77 |
| E | 10 | 10 | 40 | 7 | 3 |
| F | 20 | 20 | 20 | 20 | 20 |
| Mixing ratios of materials in middle layer |  |  |  |  |  |
| A | 80 | 90 | 70 | 70 | 70 |
| D | 20 | 10 | 30 | 30 | 30 |
| Mixing ratios of materials in polyester D |  |  |  |  |  |
| B | 60 | 80 | 75 | 75 | 75 |
| C | 40 | 20 | 25 | 25 | 25 |
| Specific surface resistance | $5 \times 10^{11}$ | $5 \times 10^{11}$ | $2 \times 10^{11}$ | $1 \times 10^{12}$ | $1 \times 10^{15}$ |
| Ash test | A | A | A | B | C |
| X/Y | 500 | 80 | 350 | 300 | 300 |
| N | 20 | 130 | 120 | 180 | 180 |
| Tear test | Passed | Passed | Passed | Passed | Passed |

TABLE 1-continued

|  | Comp. Example 1 | Comp. Example 2 | Comp. Example 3 | Comp. Example 4 |
|---|---|---|---|---|
| Mixing ratios of materials in outer layers |  |  |  |  |
| A | 80 | 80 | 80 | 70 |
| E | 0 | 0 | 0 | 10 |
| F | 20 | 20 | 20 | 20 |
| Mixing ratios of materials in middle layer |  |  |  |  |
| A | 70 | 55 | 70 | 90 |
| D | 30 | 45 | 30 | 10 |
| Mixing ratios of materials in polyester D |  |  |  |  |
| B | 75 | 80 | 100 | 45 |
| C | 25 | 20 | 0 | 55 |
| Specific surface resistance | $2 \times 10^{16}$ | $2 \times 10^{15}$ | $2 \times 10^{16}$ | $5 \times 10^{11}$ |
| Ash test | D | D | D | B |
| X/Y | 300 | 30 | — | 40 |
| N | 180 | 200 | 0 | 40 |
| Tear test | Passed | Failed | Failed | Failed |

What is claimed is:

1. A biaxially oriented polyester film having at least one layer of a sea-island structure which satisfies the following formulae (1) and (2) at the same time, said film having a specific surface resistance of not more than $1 \times 10^{15}$ Ω:

$$50 \leq X/Y \qquad (1)$$

$$5 \leq N \leq 200 \qquad (2)$$

wherein X is the mean value of length (μm) of the islands in the longitudinal direction of the film; Y is the mean value of length (μm) of the islands in the width direction of the film; and N is the number (per μm²) of the islands existing in the section of the film in its width direction.

2. A biaxially oriented polyester film according to claim 1 wherein the specific surface resistance is not more than $5 \times 10^{12}$ Ω.

3. A biaxially oriented polyester film according to claim 1 wherein the layer having a sea-island structure comprises 30 to 5% by weight of polyester D obtained from a polycondensation reaction of polyester B comprising a dicarboxylic acid moiety and a glycol moiety and a dehydrated condensate C mainly comprising a glycol, and 70 to 95% by weight of polyester A comprising ethylene terephthalate as main repeating units, said polyester D using dispersed insularly in polyester A matrix.

4. A biaxially oriented polyester film according to claim 3 wherein polyester B comprises a dicarboxylic acid moiety containing not less than 50 mol % of an aromatic dicarboxylic acid and a glycol moiety containing not less than 50 mol % of a $C_3$–$C_{10}$ glycol.

5. A biaxially oriented polyester film according to claim wherein the dehydrated condensate mainly comprises a $C_3$–$C_{10}$ glycol.

6. A biaxially oriented polyester film according to claim 3 wherein polyester D comprises 98 to 55% by weight of polyester B and 2 to 45% by weight of a dehydrated condensate C.

7. A biaxially oriented polyester film according to claim 1 containing an antistatic agent.

* * * * *